United States Patent
Kang

(10) Patent No.: US 10,208,809 B2
(45) Date of Patent: Feb. 19, 2019

(54) DOUBLE CLUTCH ASSEMBLY

(71) Applicants: VALEO PYEONG HWA CO., LTD., Daegu (KR); VALEO EMBRAYAGES, Amiens (FR)

(72) Inventor: Seok Min Kang, Daegu (KR)

(73) Assignees: Valeo Pyeong Hwa Co., Ltd., Daegu (KR); Valeo Embrayages, Amiens (FR)

( * ) Notice: Subject to any disclaimer, the term of this patent is extended or adjusted under 35 U.S.C. 154(b) by 0 days.

(21) Appl. No.: 15/310,009

(22) PCT Filed: May 11, 2015

(86) PCT No.: PCT/IB2015/000884
§ 371 (c)(1),
(2) Date: Nov. 9, 2016

(87) PCT Pub. No.: WO2015/170176
PCT Pub. Date: Nov. 12, 2015

(65) Prior Publication Data
US 2017/0138411 A1 May 18, 2017

(30) Foreign Application Priority Data
May 9, 2014 (KR) .......................... 10-2014-0055529

(51) Int. Cl.
*F16D 13/58* (2006.01)
*F16D 13/38* (2006.01)
(Continued)

(52) U.S. Cl.
CPC .......... *F16D 13/585* (2013.01); *F16D 13/385* (2013.01); *F16D 13/68* (2013.01);
(Continued)

(58) Field of Classification Search
CPC ...... F16D 13/585; F16D 13/385; F16D 13/68; F16D 13/70; F16D 21/06; F16D 2021/0615; F16D 2021/0607
See application file for complete search history.

(56) References Cited

U.S. PATENT DOCUMENTS 4,450,945 A  5/1984  Caray
4,787,492 A * 11/1988  Ball .................. F16D 21/06
                                              192/48.8
(Continued)

FOREIGN PATENT DOCUMENTS

DE  19751568 A1  6/1998
FR  2492485 A1   4/1982
(Continued)

*Primary Examiner* — Jacob S. Scott
*Assistant Examiner* — Tinh Dang
(74) *Attorney, Agent, or Firm* — Berenato & White, LLC

(57) ABSTRACT

A double clutch assembly has a diaphragm spring aligned and maintained to prevent uneven wear of a disc. A diaphragm spring is deformable in an axis direction with respect to a cover casing which receives a driving force from an engine. A center plate is connected to the cover casing and an auxiliary cover casing is coupled to the center plate to form a support point. The pressure plate is selectively connected to a center plate disc when the diaphragm spring contracts. An auxiliary pressure plate is coupled to the center plate. A disc installed between the center plate and the pressure plate provides the driving force transmitted through the pressure plate to the transmission. An auxiliary disc installed between the center plate and the auxiliary pressure plate provides the driving force through the auxiliary pressure plate to the transmission.

9 Claims, 11 Drawing Sheets

(51) Int. Cl.
*F16D 13/68* (2006.01)
*F16D 13/70* (2006.01)
*F16D 21/06* (2006.01)

(52) U.S. Cl.
CPC ............ *F16D 13/70* (2013.01); *F16D 21/06* (2013.01); *F16D 2021/0615* (2013.01)

(56) References Cited

U.S. PATENT DOCUMENTS

| | | | |
|---|---|---|---|
| 5,988,339 A | 11/1999 | Asada et al. | |
| 6,851,536 B2* | 2/2005 | Orlamunder | F16D 21/06 |
| | | | 192/48.8 |
| 8,113,327 B2* | 2/2012 | Dutier | F16D 13/755 |
| | | | 192/111.12 |
| 8,616,356 B2* | 12/2013 | Thibaut | F16D 21/06 |
| | | | 192/48.8 |
| 2014/0151181 A1* | 6/2014 | Reimnitz | F16D 21/06 |
| | | | 192/30 V |

FOREIGN PATENT DOCUMENTS

| | | |
|---|---|---|
| GB | 2158530 A | 11/1985 |
| GB | 2305698 A | 4/1997 |
| KR | 20120001521 A | 1/2012 |

\* cited by examiner

DOUBLE CLUTCH ASSEMBLY

CROSS-REFERENCE TO RELATED APPLICATIONS AND CLAIM TO PRIORITY

This application is a national stage application of International Application No. PCT/IB2015/000884 filed May 11, 2015, which claims priority to Korean Patent Application No. 10-2014-0055529 filed May 9, 2014, the disclosures of which are incorporated herein by reference and to which priority is claimed.

FIELD OF THE INVENTION

The present invention relates to a double clutch assembly, and more particularly, to a double clutch assembly in which, when a double clutch operates, the concentricity of a diaphragm spring with respect to a centre of a hub is aligned in position and maintained to prevent uneven wear of a disc, which occurs due to eccentric contact between a pressure plate and the disc, from occurring.

BACKGROUND OF THE INVENTION

In general, a double clutch transmission having two input shafts is required to use a double clutch that includes two discs to transmit a power transmitted from an engine. The double clutch demands two clutches and operates in a dual gear manner. Thus, since the shaft having the dual structure changes whenever the gear is shifted to the next one up or down, a shift speed is quick, and the shaft change is of help to actual fuel efficiency.

Particularly, a dry double clutch transmits a power of an engine by using friction between a clutch disc and a pressure plate without using oil, unlike the conventional wet double clutch. The dry double clutch is disclosed in Korean Patent Registration No. 10-1180599.

According to the related art, a double clutch (1) includes a damper flywheel (3) and a set double clutch (5). The double clutch includes a first diaphragm spring (7) fixed to a co-axis so that an outer circumference of the first diaphragm spring is covered by an annular casing (13) of the set double clutch (5), and a portion except for the outer circumference is exposed to the outside of the annular casing (13), a cover plate (9) that is disposed adjacent to the co-axis inside the first diaphragm spring (7) to support the outer circumference of the first diaphragm spring (7) by an embossing part (15) that is disposed on the co-axis to protrude outwards from the outer circumference, a second diaphragm spring (11) disposed adjacent to the co-axis inside the cover plate (9) to press a first pressure plate (21) of the set double clutch (5), and an annular support member (10) coaxially disposed between the outer circumference of the cover plate (9) and the second diaphragm spring (11) to allow the second diaphragm spring (11) to be supported by the cover plate (9).

Thus, in the double clutch (1) according to the related art, the cover plate (9) may be supported by the support member (10), and the embossing part (15) may be disposed from a centre of the cover plate (9) towards an outer circumferential end, i.e., at a position that is farthest away outwards from the centre of the cover plate in a radius direction. Thus, the outer circumference of the first diaphragm spring (7), which is supported by the embossing part (15), may also be disposed at a position that is farther away from the centre towards the outer circumferential end. Also, the first diaphragm spring (7) may maximally increase in diameter while a distance from the outer circumferential end of the first diaphragm spring (7) to the portion of the outer circumference, which is supported by the embossing part (15), is constantly maintained. As a result, since a casing (13) is constantly maintained in inner diameter, but the first diaphragm spring (7) increases in diameter, the diaphragm spring may increase in repulsive force and decrease in stress to improve durability.

However, as described above, the double clutch according to the related art may cause a problem in which an axis centre between the clutch and the diaphragm spring is warped when the diaphragm spring is contracted and restored. This mismatch in concentricity may cause eccentric contact between the pressure plate and the disc, thereby involving uneven wear of the disc.

SUMMARY OF THE INVENTION

To solve the above-described problems, an objective of the present invention provides a double clutch assembly in which, when a double clutch operates, the concentricity of a diaphragm spring with respect to a centre of a hub is aligned in position and maintained to prevent uneven wear of a disc, which occurs due to eccentric contact between a pressure plate and the disc, from occurring.

To achieve the above-described objectives, a double clutch assembly includes: a cover casing receiving a driving force from an engine to rotate; a diaphragm spring installed deformable in an axis direction with respect to the cover casing to induce displacement in the axis direction of the cover casing; a centre plate connected to the cover casing and installed to idle with respect to an input shaft of a transmission; an auxiliary cover casing coupled to the centre plate to form a support point of the diaphragm spring together with the cover casing; a pressure plate selectively connected to a disc of the centre plate when the diaphragm spring is contracted; an auxiliary pressure plate coupled to the centre plate and installed to idle with respect to the input shaft of the transmission; a disc installed between the centre plate and the pressure plate, the disc including a hub to be coupled to the input shaft of the transmission to provide the driving force transmitted through the pressure plate to the input shaft of the transmission; an auxiliary disc installed between the centre plate and the auxiliary pressure plate, the auxiliary disc including a hub to be coupled to the input shaft of the transmission to provide the driving force transmitted through the auxiliary pressure plate to the input shaft of the transmission; and a guide plate fixed to the auxiliary cover casing and fitted into at least one groove of a cutting groove of the diaphragm spring and a cutting groove of the auxiliary diaphragm spring to match an axis centre of the hub with each of an axis centre of the diaphragm spring and an axis centre of the auxiliary diaphragm spring when the diaphragm spring is contracted and restored.

In the present invention, the guide plate may include: a main body having a coupling hole for the coupling with the auxiliary cover casing; and a protrusion protruding from the main body in the radius direction and inserted into the cutting groove of the diaphragm spring. Here, the main body may have a ring shape corresponding to that of the coupled portion of the auxiliary cover casing, or the main body may be constituted by divided pieces that have an outer appearance having a ring shape as a whole by combining the pieces, each of which has an arc shape corresponding to that of the coupled portion of the auxiliary cover casing, with each other.

In the present invention, the protrusion may protrude outwards or inwards from the main body in the radius direction, and the protrusion may protrude inclinedly from the main body along the axis direction of the clutch.

In the present invention, the guide plate may further include a restriction protrusion protruding outwards from the main body in the radius direction and coupled to a circumferential surface of the diaphragm spring.

In the present invention, the restriction protrusion may include a bent part, which is bent towards the axis direction of the clutch so as to be coupled to the circumferential surface of the diaphragm spring, on a free end thereof, and the diaphragm spring may have an assembly groove in an outer circumferential surface thereof so as to be coupled to the bent part.

In the double clutch assembly according to the present invention, the guide plate protruding to the space between the diaphragm spring and the cutting groove may be installed to normally align the concentricity of the diaphragm spring with respect to the centre of the hub of the clutch and maintain the normal alignment state, thereby preventing the pressure plate and the disc from eccentrically contacting each other due to the eccentric displacement of the diaphragm spring. Therefore, the smooth transmission of the driving force may be induced due to the normal axis alignment between the centre of the hub of the double clutch and the centre of the input shaft of the transmission to assist the normal functional realization of the transmission.

DETAILED DESCRIPTION OF THE PREFERRED EMBODIMENT(S)

Figure 1:
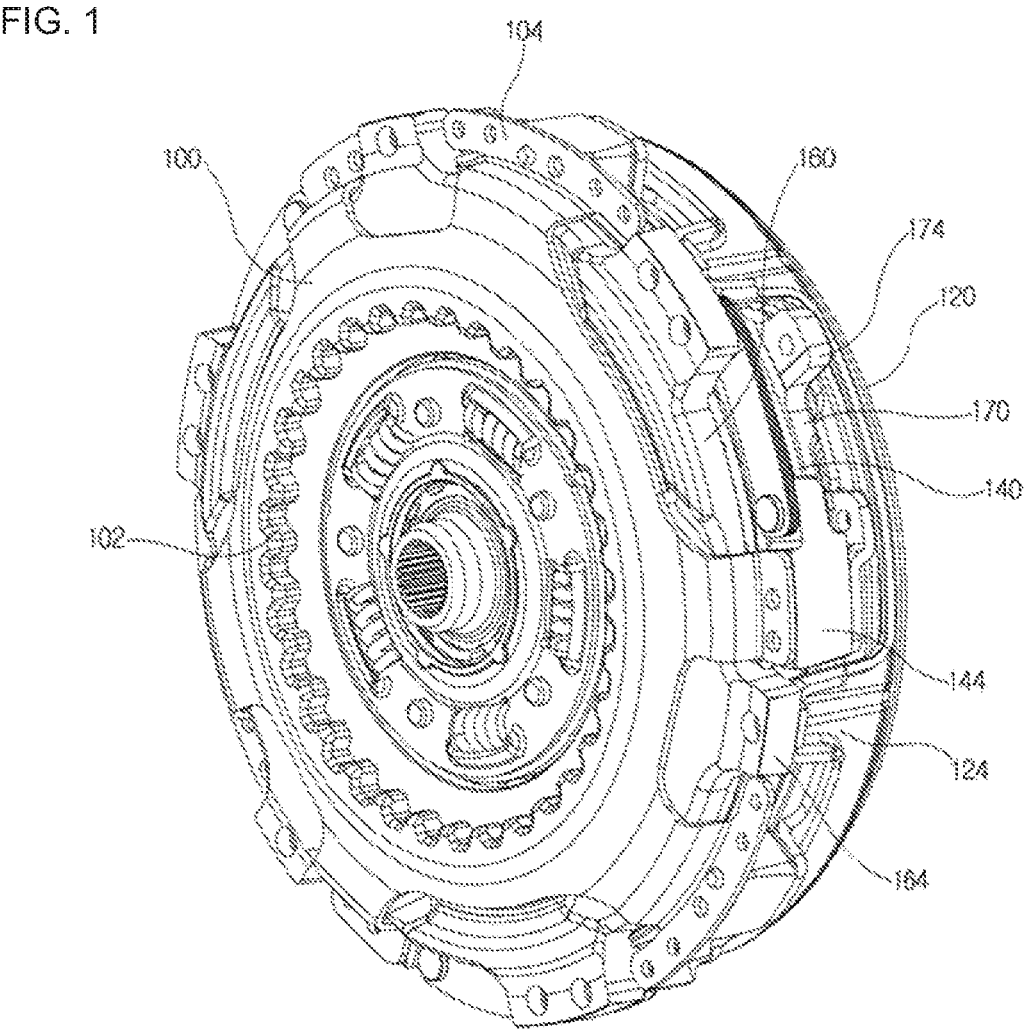
FIG. 1 is a perspective view of a double clutch assembly according to the present invention.
Figure 2:
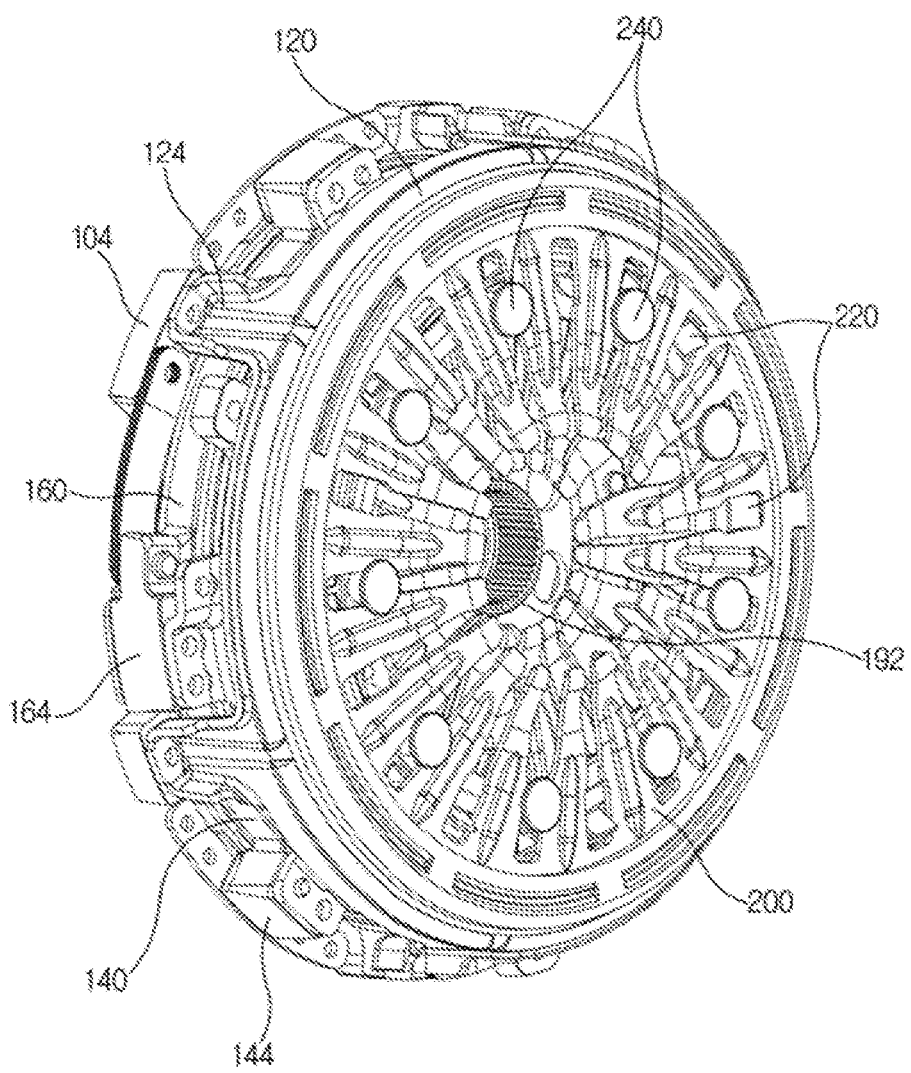
FIG. 2 is a perspective view of the double clutch assembly of FIG. 1.

Hereinafter, embodiments of the present invention will be described with reference to the accompanying drawings.

Referring to FIGS. 1 to 4, a double clutch assembly according to the present invention includes a connection casing (100), a cover casing (120), an auxiliary cover casing (130), a centre plate (140), a pressure plate (160), an auxiliary pressure plate (170), a disc (180), an auxiliary disc (190), a diaphragm spring (200), an auxiliary diaphragm spring (210), and a guide plate (220).

The connection casing (100) is directly connected to an output side of an engine to receive a driving force that is generated from the engine. For this, the connection casing (100) is provided as a circular plate member having a ring shape. Also, a serrated part (102) that is a joint portion for the power transmission with the engine is uniformly provided over an entire inner circumferential surface of a central portion of the connection casing. Also, a flange part (104) to be coupled to the centre plate (140) is disposed on an edge portion of the connection casing (100).

The cover casing (120) is coupled to the connection casing (100) to rotate with respect to a central axis (X) of a clutch (best shown in FIG. 4) when the engine is driven. For this, the cover casing (120) is provided as a ring-shaped circular plate member having a punched installation hole (122) in a central portion thereof so that the cover casing is coaxially disposed outside an input shaft of a transmission. Also, a flange part (124) to be coupled to the pressure plate (160) is disposed on an edge portion of a side of the cover casing (120).

The auxiliary cover casing (130) is coupled to a centre plate (140) rotate with respect to the central axis of the clutch when the engine is driven. For this, the auxiliary cover casing (130) is provided as a ring-shaped circular plate member having a punched installation hole (132) in a central portion thereof so that the cover casing is coaxially disposed outside the input shaft of the transmission. Also, a flange part (134) to be coupled to the centre plate (140) is disposed on an edge portion of a side of the auxiliary cover casing (130).

The centre plate (140) is coupled to the cover casing (120) to idle with respect to the input shaft of the transmission that is disposed at a centre of the clutch when the engine is driven. For this, the centre plate (140) is provided as a ring-shaped circular plate member having a punched installation hole (142) in a central portion thereof so that the centre plate is coaxially disposed outside the input shaft of the transmission. Also, a flange part (144) to be coupled to the connection casing (100) at a position corresponding to the flange part (104) of the connection casing (100) is disposed on an edge portion of the centre plate (140). Also, a bearing (146) for idling with respect to the input shaft of the transmission is installed in an inner circumferential surface of the installation hole (142) of the centre plate (140).

The pressure plate (160) is coupled to the cover casing (120) to idle with respect to the central axis of the clutch when the engine is driven. For this, the pressure plate (160) is provided as a ring-shaped circular plate member having a punched installation hole (162) in a central portion thereof so that the pressure plate is coaxially disposed outside the input shaft of the transmission. Also, a flange part (164) to be coupled to the cover casing (120) at a position corresponding to the flange part (124) of the cover casing (120) is disposed on an edge portion of the pressure plate (160).

The auxiliary pressure plate (170) is coupled to the centre plate (140) to idle with respect to the input shaft of the transmission that is disposed at the centre of the clutch when the engine is driven. For this, the auxiliary pressure plate (170) is provided as a ring-shaped circular plate member having a punched installation hole (172) in a central portion thereof so that the auxiliary pressure plate is coaxially disposed outside the input shaft of the transmission. Also, a flange part (174) to be coupled to the centre plate (140) is disposed an edge portion of the auxiliary pressure plate (170).

The disc (180) is disposed between the centre plate (140) and the pressure plate (160) and connected to the pressure plate (160) by movement of the cover casing (120) in an axis direction due to the contraction of the diaphragm spring (200). Thus, the driving force provided to the centre plate (140) is provided to the pressure plate (160) via the disc (180). For this, the disc (180) includes a hub (182) to be coupled to one of the input shafts of the transmission, for example, a hollow input shaft at a central portion thereof. Also, a damper spring (184) for buffering a sudden vibration of the driving force is installed around the hub (182) of the disc (180).

The auxiliary disc (190) is disposed between the centre plate (140) and the auxiliary pressure plate (170) and connected to the auxiliary pressure plate (170) by movement of the auxiliary cover casing (130) in the axis direction due to the contraction of the auxiliary diaphragm spring (210). Thus, the driving force provided to the centre plate (140) is provided to the auxiliary pressure plate (170) via the auxiliary disc (190). For this, the auxiliary disc (190) includes a hub (192) to be coupled to one of the input shafts of the transmission, for example, a hollow input shaft at a central portion thereof.

Figure 4:
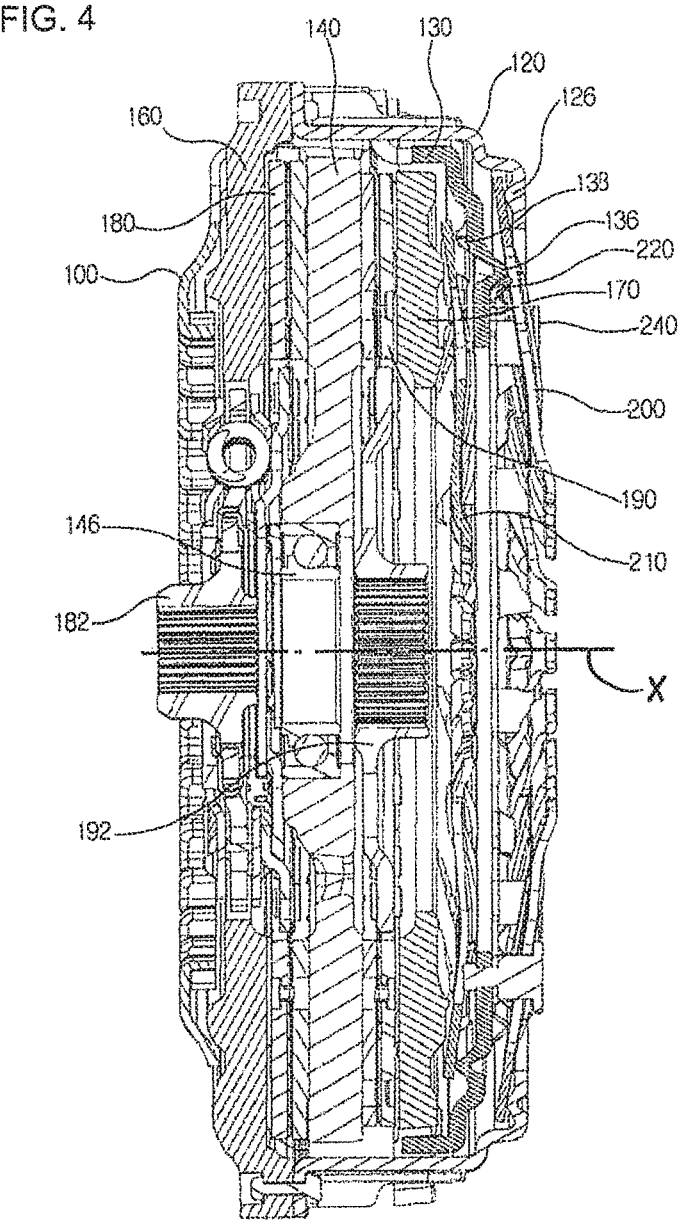
FIG. 4 is a cross-sectional view illustrating the whole constitution of the double clutch assembly of FIGS. 1 and 2.
Figure 6:
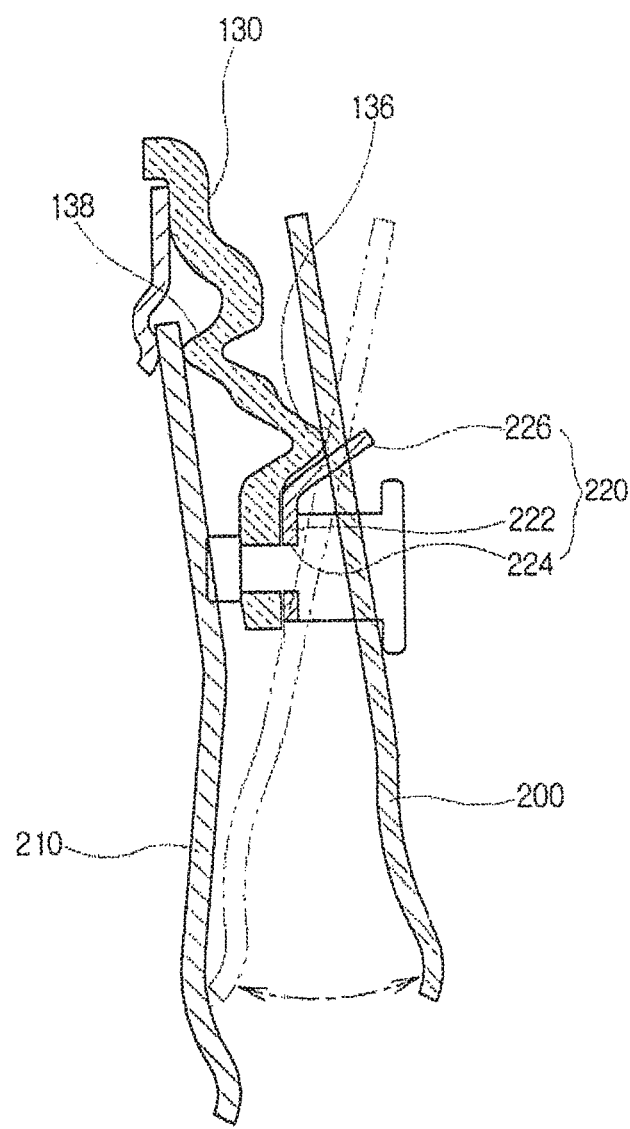
FIG. 6 is a locally enlarged cross-sectional view of a main part so as to explain an alignment function of concentricity, which is realized by the guide plate of FIG. 5 when the diaphragm spring is contracted and restored.

The diaphragm spring (200) is a leaf spring having a washer shape and disposed between the cover casing (120) and the auxiliary cover casing (130). The diaphragm spring (200), illustrated in detail in FIG. 9, includes an elastic piece that is divided into a plurality of parts so that a cutting groove (202) is radially formed from a circumferential surface on edge portion (201) towards a central portion (203) thereof. In this case, the central portion (203) of the diaphragm spring (200) is opened to install the input shaft of the transmission. Also, as illustrated in FIG. 6, the diaphragm spring (200) is inclinedly contracted and deformed in the axis direction of the clutch as an actuator operates to realize displacement in the axis direction with respect to the cover casing (120). Thus, the center plate (140), the disc (180), and the pressure plate (160) are connected to each other to easily transmit the driving force. For this, as illustrated in FIG. 4, the cover casing (120) includes a first protrusion (126) that protrudes to the diaphragm spring (200) to form a supporting point of the diaphragm spring (200), and the auxiliary cover casing (130) includes a second protrusion (136) of the cover casing (120); which protrudes to the diaphragm spring (200) to form a supporting point of the diaphragm spring (200) together with the first protrusion (126). Here, the first protrusion (126) is disposed on the edge portion that is adjacent to the circumferential surface in comparison to the second protrusion (136) with respect to a radius direction of the diaphragm spring (200).

Figure 3:
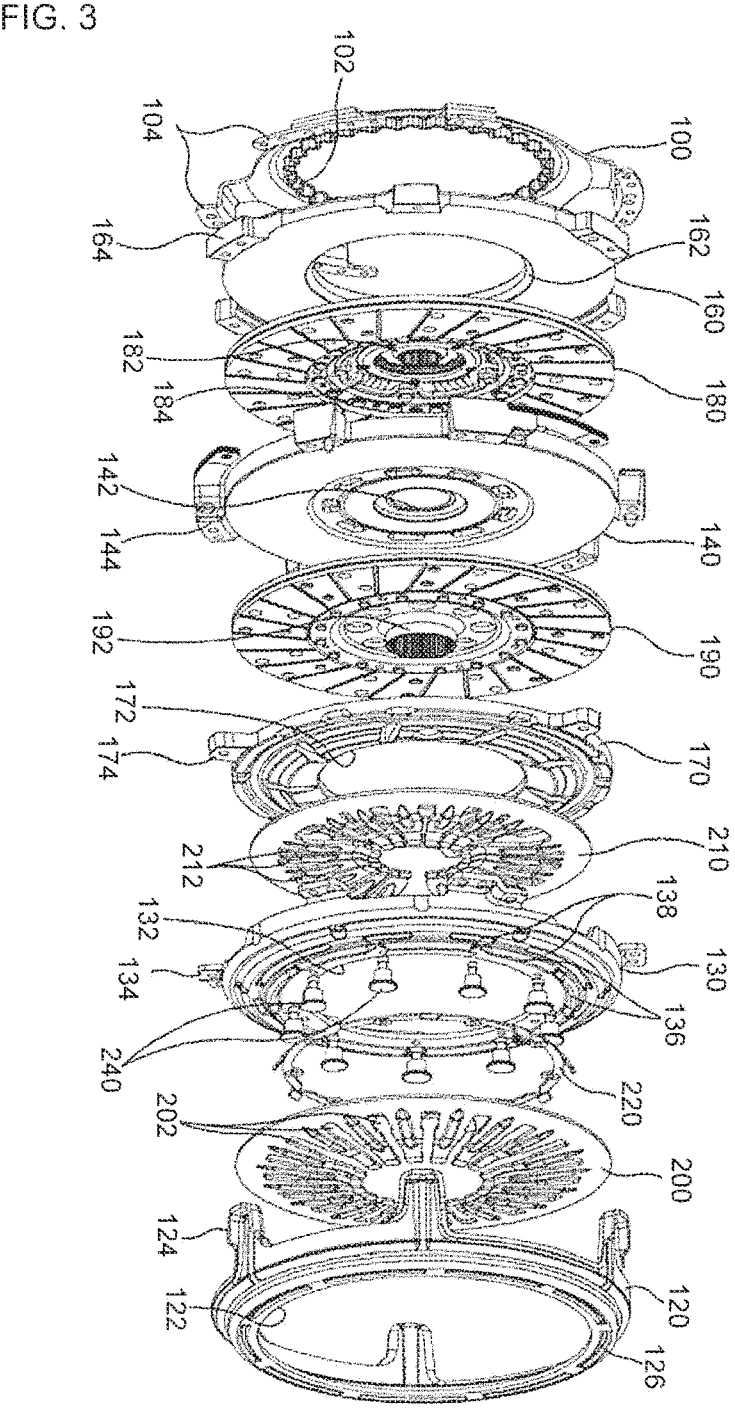
FIG. 3 is an exploded perspective view illustrating the whole constitution of the double clutch assembly of FIGS. 1 and 2.
Figure 6A:
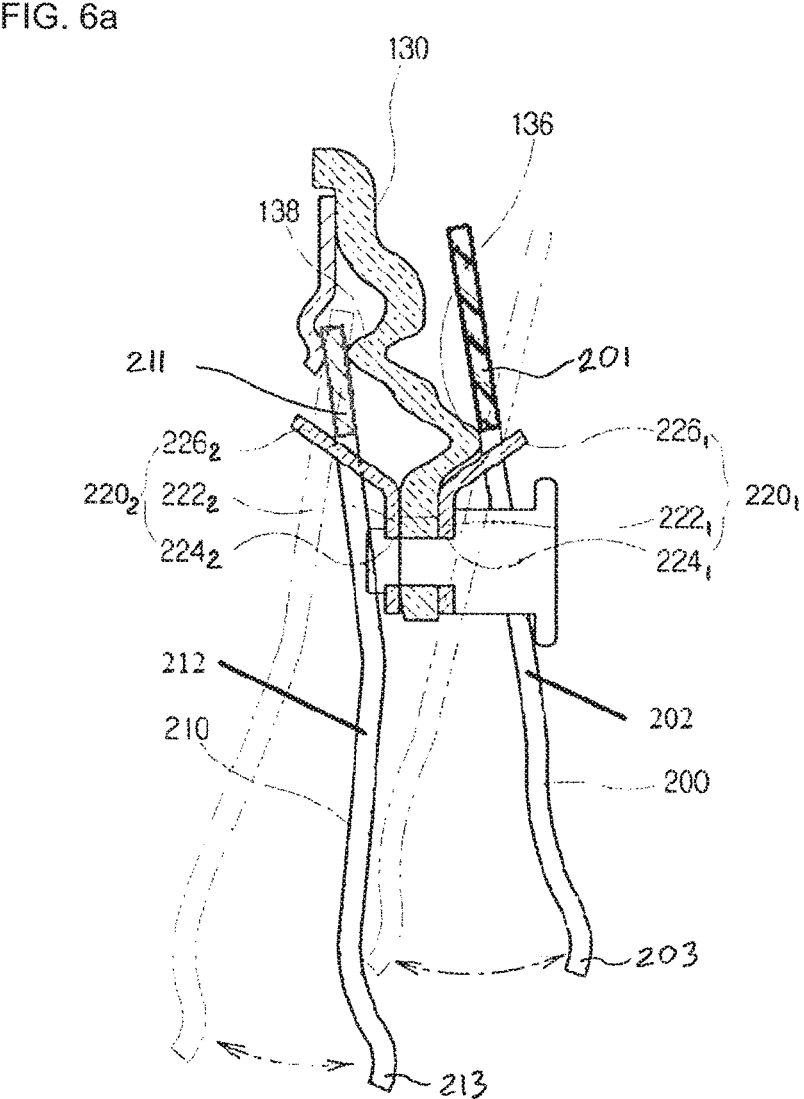
FIG. 6a is a locally enlarged cross-sectional view of a main part so as to explain an alignment function of concentricity, which is realized by the guide plate of FIG. 5 when the diaphragm spring and an auxiliary diaphragm spring are contracted and restored according to an embodiment to which the guide plate of FIG. 5 is additionally applied.

The auxiliary diaphragm spring (210) is a leaf spring having a washer shape and disposed between the auxiliary cover casing (130) and the auxiliary pressure plate (170). The auxiliary diaphragm spring (210), as illustrated in FIG. 3, is structurally similar to the diaphragm spring (200) and includes an elastic piece that is divided into a plurality of parts so that cutting grooves (212) are radially formed from a circumferential surface of an edge portion (211) towards a central portion (213) thereof. In this case, the central portion (213) of the auxiliary diaphragm spring (210) is opened to install the input shaft of the transmission. Also, like the diaphragm spring (200), as illustrated in FIG. 6a, the auxiliary diaphragm spring (210) is inclinedly contracted and deformed in the axis direction of the clutch as the actuator operates to realize displacement in the axis direction with respect to the cover casing (120). Thus, the center plate (140), the auxiliary disc (190), and the auxiliary pressure plate (170) are connected to each other to easily transmit the driving force. For this, as illustrated in FIG. 4, the auxiliary cover casing (130) includes a third protrusion (138) that protrudes to the auxiliary diaphragm spring (210) to form a supporting point of the auxiliary diaphragm spring (210). In this case, the third protrusion (138) forms a support point with respect to the auxiliary diaphragm spring (210) in a single place, unlike the first protrusion (126) and the second protrusion (136). In more detail, the third protrusion is disposed at a position for forming a support point with respect to an outer edge portion in the radius direction of the auxiliary diaphragm spring (210).

As illustrated in FIGS. 4 and 6, the guide plate (220) is fixed to one surface of the auxiliary cover casing (130) and fitted axially into the cutting groove (202) of the diaphragm spring (200) to match the central axis of the clutch with a central axis of the diaphragm spring (200) when the diaphragm spring (200) is contracted and restored, i.e., to match concentricity between the diaphragm spring (200) and the clutch. Here, the guide plate (220) is fixed (i.e., non-moveably secured) to the auxiliary cover casing (130) by using a coupling pin (240) as a medium, and a head of the coupling pin (240) is exposed to the outside through the cutting groove (202) of the diaphragm spring (200).

Also, as illustrated in FIG. 6a, two (first and second) guide plates ($220_1$ and $220_2$) are employed. One of the two guide plates ($220_1$ and $220_2$) is fixed to each of axially opposite surfaces of the auxiliary cover casing (130) and separately fitted into the cutting groove (202) of the diaphragm spring (200) and the cutting groove (212) of the auxiliary diaphragm spring (210) to match an axis center of the clutch with an axis center of each of the diaphragm spring (200) and the auxiliary diaphragm spring (210) when the diaphragm spring (200) and the auxiliary diaphragm spring (210) are contracted and restored, i.e., to match concentricity between the diaphragm spring (200) and the clutch as well as concentricity between the auxiliary diaphragm spring (210) and the clutch. Here, the pair of guide plates ($220_1$ and $220_2$) is installed to be independently fixed to each of front and rear portions of the coupling pin (240) coupled to the auxiliary cover casing (130).

Figure 5:
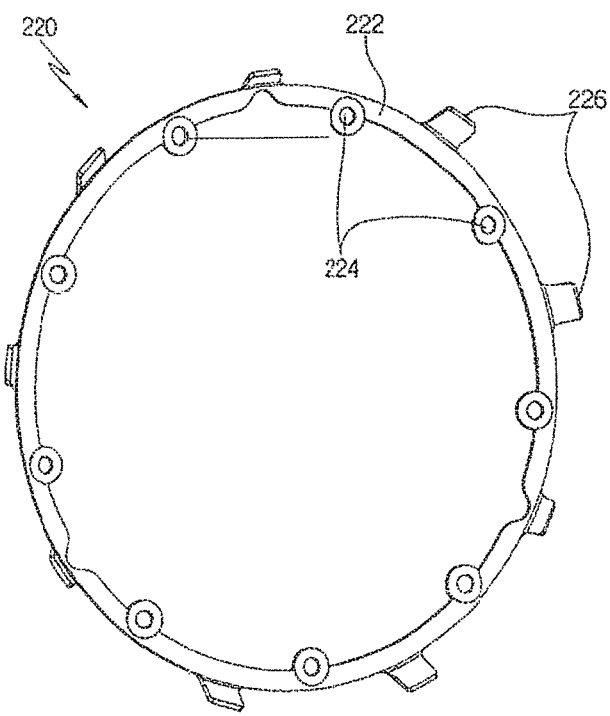
FIG. 5 is a perspective view of a guide plate of FIGS. 3 and 4.

For this, as illustrated in FIG. 5, the guide plate (220) includes a ring-shaped main body (222) having a coupling hole (224) for the coupling of the auxiliary cover casing (130) by using the coupling pin (240) as a medium and a protrusion (226) protruding from the main body (222) in a radius direction and inserted into the cutting groove (202) of the diaphragm spring (200). Here, the main body (222) may have a size corresponding to that of the coupled portion of the auxiliary cover casing (130). Particularly, the coupling hole (224) may be provided in plurality over an entire circumference in a radial direction with respect to the main body (222). Similarly, the protrusion (226) may also be provided in plurality over the entire circumference in the radial direction with respect to the main body (222).

Figure 5A:
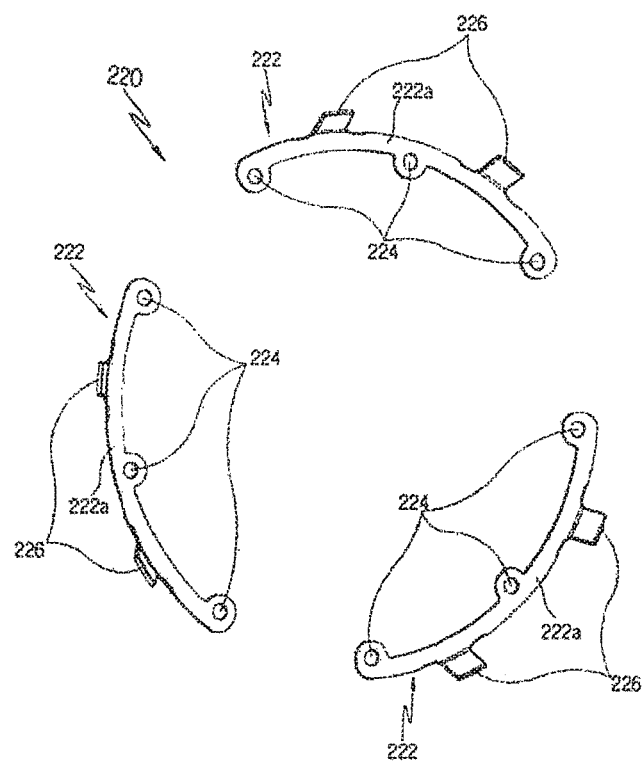
FIG. 5a is a perspective view illustrating a modified example of the guide plate of FIGS. 3 and 4.

Unlike this, as illustrated in FIG. 5a, the guide plate (220) is constituted by a plurality of divided pieces (222a) in which the pieces each of which has an arc shape are combined with each other to form a ring shape as a whole. In this case, for the coupling of the auxiliary cover casing (130) by using the coupling pin (240) as a medium, the coupling holes (224) as well as the plurality of protrusions (226) are separately formed by the divided pieces (222a).

Also, the protrusion (226) of the guide plate (220) protrudes outwards from the main body (222) in the radius direction, i.e., inclinedly protrudes from the main body (222) along an axial direction of the clutch. On the other hand, the protrusion (226) may protrude inwards from the main body (222) towards an axis centre of the hub in the radius direction. Thus, the protrusion (226) of the guide plate (220) may perform a function for maintaining the concentricity so that the axis centre of the diaphragm spring (200) is not displaced at a predetermined position with respect to the axis centre of the clutch when the diaphragm spring (200) is contracted and restored. That is, as illustrated in FIG. 6, the guide plate (220) may normally align and maintain the concentricity of the diaphragm spring (200) with respect to the hub of the clutch when the diaphragm spring (200) is pressed and restored according to the operation of the double clutch through the formation of the protrusion (226) protruding into a space of the cutting groove (202) of the diaphragm spring (200). Thus, the eccentric contact between the pressure plate (160) and the disc (180) due to the eccentric displacement of the diaphragm spring (200) may be prevented to prevent the disc (180) from being unevenly worn. Thus, the smooth transmission of the driving force may be induced due to the normal axis alignment between the centre of the hub of the double clutch and the centre of the input shaft to assist the normal function realization of the transmission.

As illustrated in FIG. 6a, the guide plates ($220_1$ and $220_2$) are substantially structurally identical to the guide plate (220) shown in FIGS. 5 and 6. Specifically, the guide plate ($220_1$) includes a ring-shaped main body ($222_1$) having a coupling hole ($224_1$) for coupling the auxiliary cover casing (130) by using a coupling pin (240) as a medium and a protrusion ($226_1$) protruding from the main body ($222_1$) in a radial direction and inserted into the cutting groove (202) of the diaphragm spring (200). Here, the main body ($222_1$) may have a size corresponding to that of the coupled portion of the auxiliary cover casing (130). Particularly, the coupling hole ($224_1$) and the protrusion ($226_1$) may be provided in plurality over an entire circumference in a radial direction with respect to the main body ($222_1$). Similarly, the guide plate ($220_2$) includes a ring-shaped main body ($222_2$) having a coupling hole ($224_2$) for coupling the auxiliary cover casing (130) by using the coupling pin (240) as a medium and a protrusion ($226_2$) protruding from the main body ($222_2$) in a radial direction and inserted into the cutting groove (202) of the diaphragm spring (200). Here, the main body ($222_2$) may have a size corresponding to that of the coupled portion of the auxiliary cover casing (130). Particularly, the coupling hole ($224_2$) and the protrusion ($226_2$) may be provided in plurality over an entire circumference in a radial direction with respect to the main body ($222_2$). Also, as illustrated in FIG. 6a, the guide plates ($220_1$ and $220_2$) may normally align and maintain the concentricity of each of the diaphragm spring (200) and the auxiliary diaphragm spring (210) with respect to the hub of the clutch when the diaphragm spring (200) and the auxiliary diaphragm spring (210) are pressed and restored according to the operation of the double clutch through the formation of the protrusion (226) inserted into each of the cutting groove (202) of the diaphragm spring (200) and the cutting groove (212) of the auxiliary diaphragm spring (210). Thus, the eccentric contact between the pressure plate (160) and the disc (180) due to the eccentric displacement of each of the diaphragm spring (200) and the auxiliary diaphragm spring (210) may be prevented to prevent the disc (180) from being unevenly worn. Thus, the smooth transmission of the driving force may be induced due to the normal axis alignment between the center of the hub of the double clutch and the centre of the input shaft to assist the normal function realization of the transmission.

Figure 7:
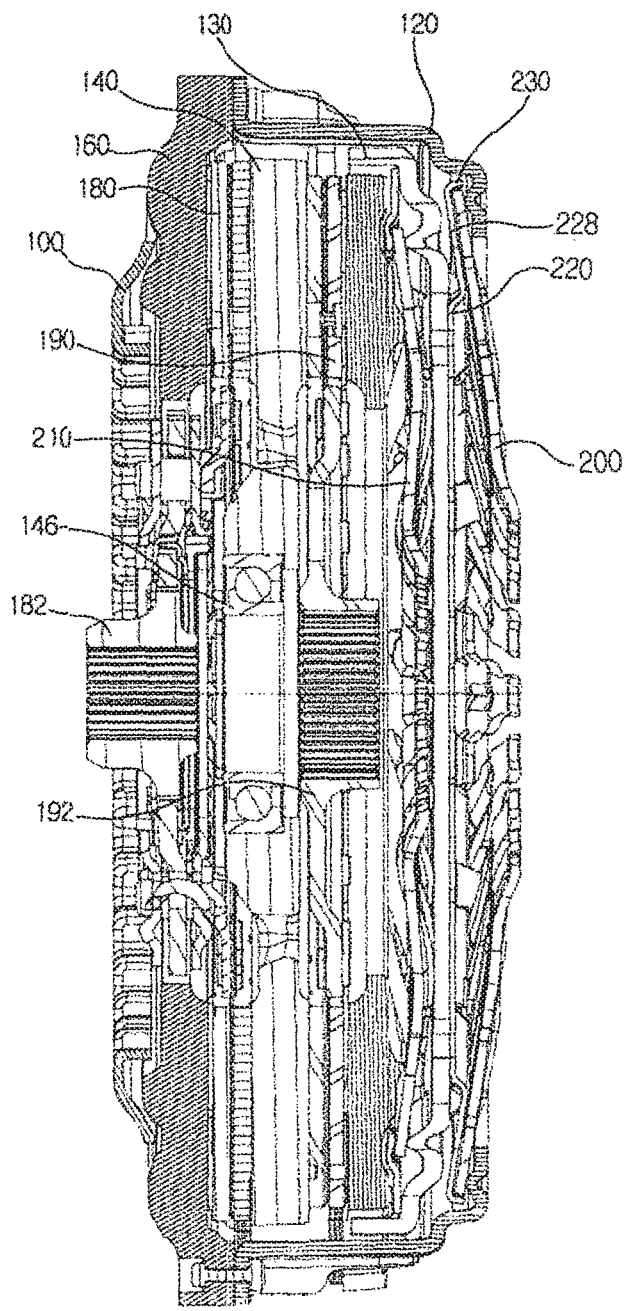
FIG. 7 is a cross-sectional view illustrating the whole constitution of a double clutch assembly according to another embodiment of the present invention.
Figure 8:
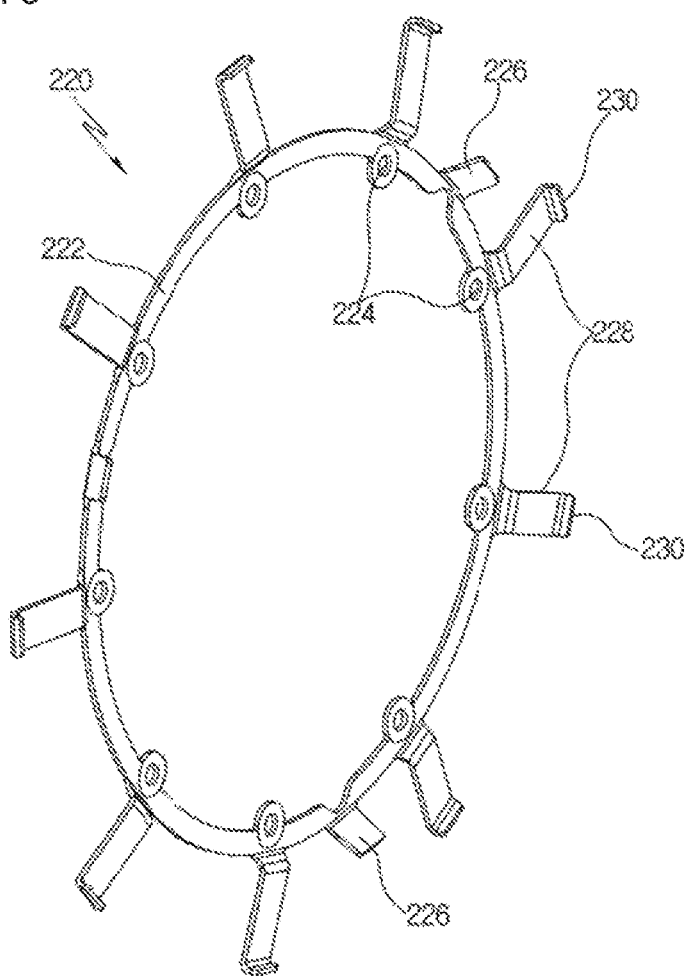
FIG. 8 is a perspective view of a guide plate of FIG. 7.
Figure 8A:
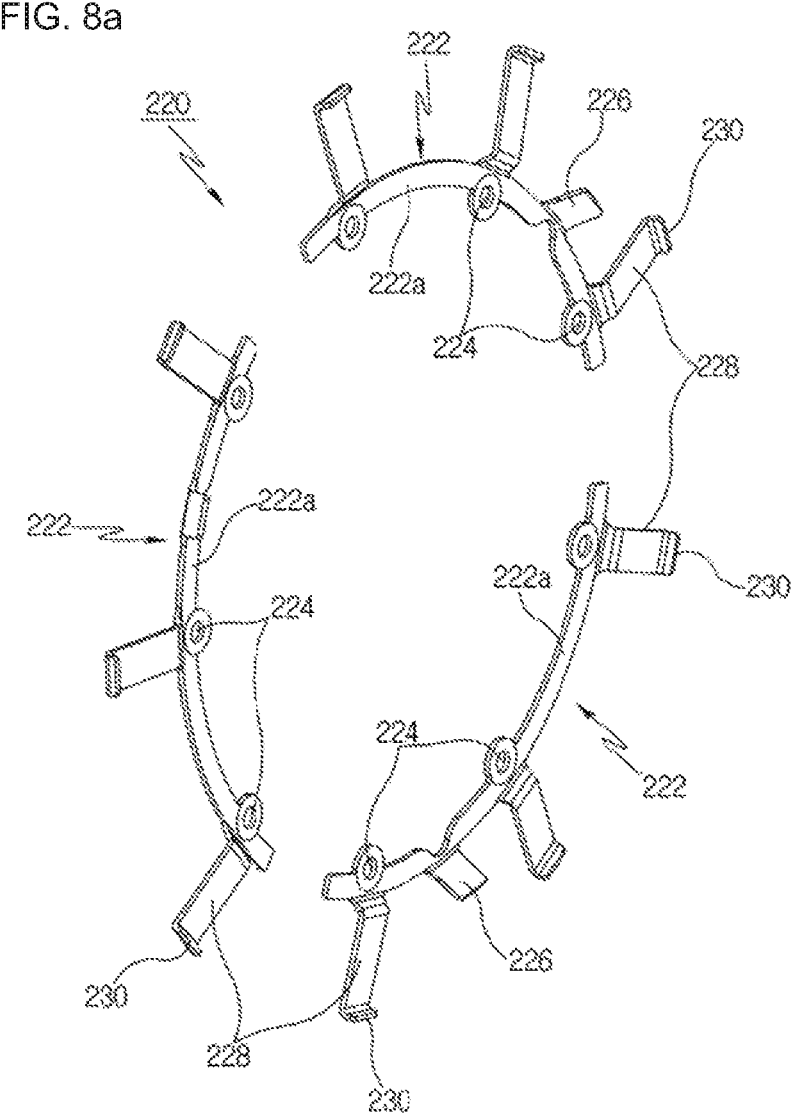
FIG. 8a is a perspective view illustrating a modified example of the guide plate of FIG. 7.
Figure 9:
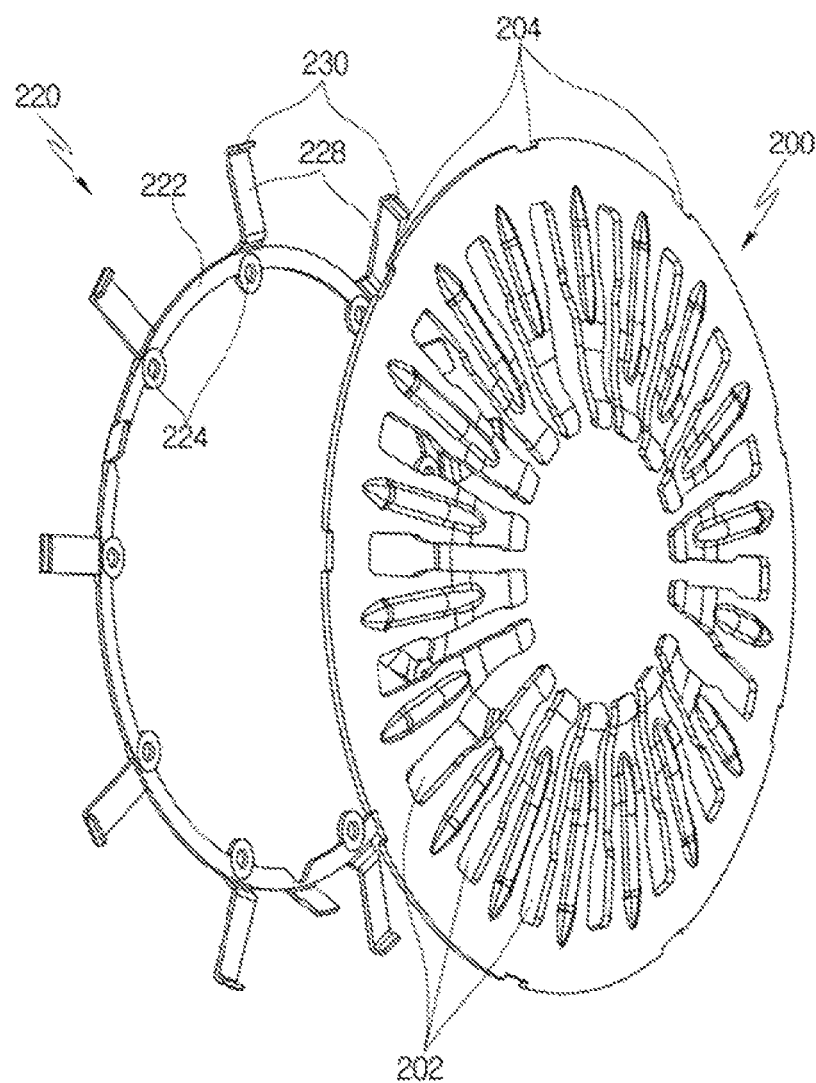
FIG. 9 is a locally enlarged perspective view of only a coupling portion between the guide plate and a diaphragm spring, which are illustrated in FIGS. 7 and 8.

Also, as illustrated in FIGS. 7 to 9, the guide plate (220) includes a ring-shaped main body (222) having a coupling hole (224) for the coupling of the auxiliary cover casing (130) and a restriction protrusion (228) protruding from the main body (222) in a radius direction and coupled to a circumferential surface of the diaphragm spring (200) to restrict the concentricity of the diaphragm spring (200) with respect to the axis centre of the clutch. Particularly, as illustrated in FIG. 8, in the restriction protrusion (228), a bent part (230) that is bent towards the axial direction of the clutch to firmly couple the circumferential surface of the diaphragm spring (200) is integrally formed on a free end that is disposed to the outside in the radius direction. In this case, if the guide plate (220) further includes a protrusion (226) that protrudes from the main body (222) in the radius direction and is inserted into the cutting groove (202) of the diaphragm spring (200), the function for maintaining the concentricity so that the axis centre of the diaphragm spring (200) is not displaced at a predetermined position with respect to the axis centre of the clutch when the diaphragm spring (200) is contracted and restored may be more smoothly performed. In this case, as illustrated in FIG. 9, the diaphragm spring (200) has an assembly groove (204) having a concave shape on an outer surface thereof so as to be coupled to the bent part (230) formed on the free end of the restriction protrusion (228) of the guide plate (220). Particularly, the assembly groove (204) may be provided in plurality in a position corresponding to the bent part (230) of the restriction protrusion (228) formed on the guide plate (220), i.e., provided in a radius direction over an entire circumference of the diaphragm spring (200). In this case, as illustrated in FIG. 8a, the guide plate (220) is constituted by a plurality of divided pieces (222a) in which the pieces each of which has an arc shape are combined with each other to form a ring shape as a whole. Here, for the coupling of the auxiliary cover casing (130) by using the coupling pin (240) as a medium, the coupling holes (224) as well as the plurality of protrusions (226) are separately formed by the divided pieces (222a).

As described above, although the preferred embodiment of the present invention is described with reference to the accompanying drawings, the present invention is not limited to the above-described specific embodiment, and those with ordinary skill in the technical field of the present invention will understand that the present invention can be carried out in other specific forms without changing the technical idea or essential features.

The invention claimed is:

1. A double clutch assembly, comprising:
   a cover casing adapted for receiving a driving force from an engine to rotate;
   a diaphragm spring deformable in an axial direction with respect to the cover casing to induce displacement relative to the cover casing in the axial direction of the cover casing;
   a center plate connected to the cover casing and configured to idle with respect to an input shaft of a transmission;
   an auxiliary cover casing coupled to the center plate to form a support point of the diaphragm spring together with the cover casing;

a pressure plate selectively connected to the center plate when the diaphragm spring is contracted;

an auxiliary pressure plate coupled to the center plate and configured to idle with respect to the input shaft of the transmission;

an auxiliary diaphragm spring deformable in the axial direction with respect to the cover casing;

a disc installed between the center plate and the pressure plate, the disc comprising a hub to be coupled to the input shaft of the transmission to provide the driving force transmitted through the pressure plate to the input shaft of the transmission;

an auxiliary disc installed between the center plate and the auxiliary pressure plate, the auxiliary disc comprising an auxiliary hub to be coupled to the input shaft of the transmission to provide the driving force transmitted through the auxiliary pressure plate to the input shaft of the transmission; and a guide plate non-moveably secured to the auxiliary cover casing and fitted axially into a cutting groove of the diaphragm spring and a cutting groove of the auxiliary diaphragm spring;

the cutting groove of the diaphragm spring is formed radially from an edge portion towards a central portion thereof;

the cutting groove of the auxiliary diaphragm spring is formed radially from an edge portion towards a central portion thereof.

2. The double clutch assembly according to claim 1, wherein the guide plate comprises: a main body having a coupling hole for non-moveably coupling with the auxiliary cover casing; and a protrusion protruding from the main body in a radial direction and inserted into the cutting groove of the diaphragm spring.

3. The double clutch assembly according to claim 2, wherein the main body has a ring shape corresponding to a shape of a coupled portion of the auxiliary cover casing.

4. The double clutch assembly according to claim 2, wherein the main body includes a plurality of divided pieces together forming a ring shape as a whole by combining the pieces, each of the pieces has an arc shape corresponding to a shape of a segment of a coupled portion of the auxiliary cover casing.

5. The double clutch assembly according to claim 2, wherein the protrusion protrudes outwards or inwards from the main body in the radial direction.

6. The double clutch assembly according to claim 5, wherein the protrusion protrudes from the main body in the axial direction and is slanted relative to a central axis of the double clutch assembly.

7. The double clutch assembly according to claim 2, wherein the guide plate further comprises a restriction protrusion protruding outwards from the main body in the radial direction and coupled to a circumferential surface of the diaphragm spring.

8. The double clutch assembly according to claim 7, wherein the restriction protrusion comprises a bent part, which is bent towards a central axis of the double clutch assembly so as to be coupled to the circumferential surface of the diaphragm spring, on a free end thereof.

9. The double clutch assembly according to claim 8, wherein the diaphragm spring has an assembly groove in an outer circumferential surface thereof so as to be coupled to the bent part.

\* \* \* \* \*